United States Patent [19]

Inouye

[11] 4,446,521

[45] May 1, 1984

[54] IMAGE RECONSTRUCTION APPARATUS AND PROCESS

[75] Inventor: Tamon Inouye, Kawasaki, Japan

[73] Assignee: Tokyo Shibaura Denki Kabushiki Kaisha, Kawasaki, Japan

[21] Appl. No.: 245,758

[22] Filed: Mar. 20, 1981

[30] Foreign Application Priority Data

Mar. 28, 1980 [JP] Japan ................. 55-38871

[51] Int. Cl.³ ............... G06F 15/42; G01N 23/00
[52] U.S. Cl. ........................... 364/414; 364/576; 378/901; 382/6
[58] Field of Search .............. 364/414, 515, 576; 378/4, 11, 12, 901; 382/4, 6

[56] References Cited

U.S. PATENT DOCUMENTS

| 4,138,721 | 2/1979 | Boyd ........................... 364/414 |
| 4,205,375 | 5/1980 | Inouye et al. ................. 364/414 |
| 4,274,140 | 6/1981 | Watson ........................ 364/414 |
| 4,305,127 | 12/1981 | Heuscher ..................... 378/901 |

FOREIGN PATENT DOCUMENTS 54-98150  2/1979  Japan ................. 364/414
55-8166   3/1980  Japan .

OTHER PUBLICATIONS

Tamon Inouye, "Image Reconstruction With Limited Angle Projection Data," IEEE Transaction on Nuclear Science, vol. NS-26, No. 2, pp. 2666-2669 (Apr. 1979).
Kowalski, "Fast 3-D Scanning Systems Using a Limited Tilting Angle," Applied Optics, vol. 16, No. 6, pp. 1686-1690 (1977).

*Primary Examiner*—Errol A. Krass
*Attorney, Agent, or Firm*—Finnegan, Henderson, Farabow, Garrett & Dunner

[57] ABSTRACT

An image reconstruction apparatus of the present invention comprises units for measuring projection data from a number of angular directions within an angular range less than 180° with respect to a subject, a unit for performing parallel displacement of the projection data so that the subject may substantially be located within a specific region corresponding to said angular range, a unit for calculating a Fourier coefficient for expanding the displaced that into a Fourier series, and units for reconstructing a slice image of the subject by means of the calculated Fourier coefficient.

8 Claims, 10 Drawing Figures

IMAGE RECONSTRUCTION APPARATUS AND PROCESS

This invention relates to an image reconstruction apparatus having a means for measuring projection data from a multitude of angular directions within a predetermined angular range less than 180° with respect to a subject.

A method for reconstructing a slice image (hereinafter referred to as original distribution) of a subject by using projection data for a multitude of angular directions within a predetermined angular range not less than 180° to the subject has already been put to practical use for CT (computerized tomography). The principle of an image reconstruction method used in conventional CT is based on the fact that a onedimensional Fourier transform of a projection image, i.e. a set of the projection data formed at an angle $\theta$ to the subject, gives a component on a straight line along the direction of the angle $\theta$ in a system of polar coordinates representing the two-dimensional Fourier transform of the subject. In order to obtain directly all pieces of information on the Fourier transform plane, therefore, projection images from all directions corresponding to a range $0 \leq \theta < 2\pi$ (actual measurement may be made for a range $0 \leq \theta < \pi$ because of the symmetry of the projection images) are collected in the conventional CT.

On the other hand, there has already been proposed an apparatus capable of reconstructing the whole image of the original distribution by collecting only partial projection data, so disclosed in the patented as U.S. Pat. No. 4,205,375. This apparatus is so constructed that only projection data corresponding to a partial angular range $\phi (0 \leq \phi < \theta max < \pi)$ are collected, that a function of the Fourier transforms of the projection images responding to the subject are obtained from these projection data by presumption, and that necessary information for the reconstruction for an angular range in which no data are actually collected is produced by using those functions.

The above-mentioned conventional apparatus, however, involves an operation to estimate, from the partially measured projection data, the projection data for the angular range (hereinafter referred to as no-data angular range) in which no data is actually collected. Accordingly, the estimated value becomes inaccurate if noises or the like attributable to various causes are superposed on the actually measured projection data, thus exerting a far-reaching influence on the image of the original distribution.

The object of this invention is to provide an image reconstruction apparatus free from the aforementioned drawbacks of the prior art apparatus and capable of reconstructing original distribution from projection data measured only for an angular range less than 180° without using any presumptive operation.

To this end, the image reconstruction apparatus of the invention is provided with means for performing parallel displacement of the projection data obtained by the measuring means so that the subject may substantially be located within a specific region corresponding to said angular range, means for calculating a Fourier coefficient for expanding data obtained by the parallel displacement means into a Fourier series, and means for reconstructing a slice image of the subject by means of the Fourier coefficient calculated by the calculating means.

With use of the image reconstruction apparatus of the invention, projection data for a number of directions included in an angular range less than 180° are measured, and the original distribution can be reconstructed by using only the measured data without estimating projection data for the remaining directions from these measured data.

This invention can be more fully understood from the following detailed description when taken in conjunction with the accompanying drawings, in which.

Figure 1:
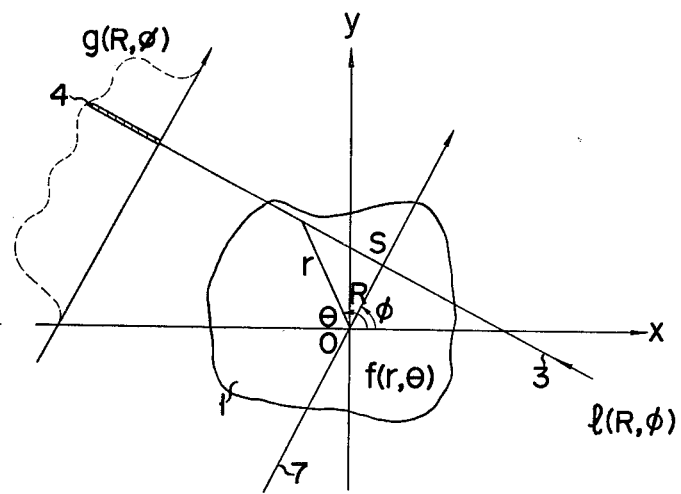
FIGS. 1, 2, 3, 4A and 4B illustrate the principle of an image reconstruction apparatus according to this invention.

First, the principle of this invention will be described in brief. In FIG. 1, a subject 1 is located with its center substantially at the origin O. The original distribution of the X-ray absorption coefficient of the subject 1 is represented by $f(r, \theta)$ in a polar coordinate system. Supposing a straight line 2 which passes through the origin O at an angle $\phi$ to the X-axis, a straight line 3 at right angles to the straight line 2 may be given by $l(R, \phi)$. Here R is the distance between the straight line 3 and the origin O. If the projection data for the straight line 3 given by $g(R, \phi)$ as the integral value of absorption coefficients along the straight line 3, it may be defined as follows:

$$g(R,\phi) = \int_{l(R,\phi)} f(r,\theta)ds. \tag{1}$$

The data $f(r, \theta)$ and $g(R, \phi)$ are cyclic with respect to angles $\theta$ and $\phi$, respectively, and may be Fourier-expanded as follows:

$$g(R,\phi) = \sum_{n=-\infty}^{\infty} gn(R)e^{in\phi}, \tag{2}$$

$$f(R,\theta) = \sum_{n=-\infty}^{\infty} fn(r)e^{in\theta}. \tag{3}$$

Here $gn(R)$ and $fn(r)$ are Fourier coefficients that are given respectively by $$gn(R) = \frac{1}{2\pi} \int_{-\pi}^{\pi} f(R,\phi)e^{-in\phi} d\phi. \tag{4}$$

$$fn(r) = \frac{1}{2\pi} \int_{-\pi}^{\pi} f(r,\theta)e^{-in\theta} d\theta. \tag{5}$$

Then, we may obtain the following equation representing the relationship between those two Fourier coefficients:

$$fn(r) = -\frac{1}{\pi} \frac{d}{dr} \int_r^\infty \frac{gn(R)Tn(R/r)}{\sqrt{(R/r)^2 - 1}} \cdot R \, dR. \quad (6)$$

Here $Tn(x)$ is a Tschebyscheff polynomial of n-th degree given by $$Tn(x) = \cos[n\cos^{-1}(x)]. \quad (7)$$

For example, we may have $T_0(x)=1$, $T_1(x)=x$, $T_2(x)=2x^2-1$, $T_3(x)=4x^3-3x$, $T_4(x)=8x^4-8x^2+1, \ldots$ Accordingly, the projection data $g(R, \phi)$ are first collected, and the Fourier coefficient $gn(R)$ is obtained in accordance with eq. (4). Then, the original distribution $f(r, \theta)$ can be reconstructed according to eq. (3) by using the Fourier coefficients $fn(r)$ obtained from eq. (6). The basis of such reconstruction method is proposed by A.M. Cormack (A.M. Cormack: Jour. Appl. Phys. 34 2722(1963), Jour. Appl. Phys. 35 2908(1964)).

Here it is to be noted that the Fourier coefficient $fn(r)$ can be determined by using only the Fourier coefficient $gn(R)$ where there is relationship $R>r$. This means that projection data along some directions, except value 0, never contribute to the reconstruction of some regions of the original distribution.

Figure 2:
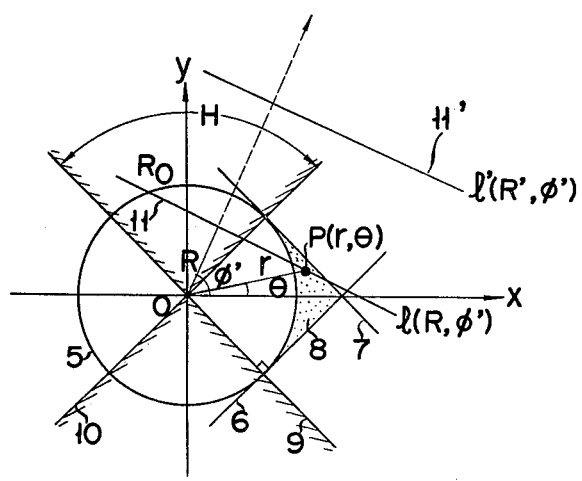

Referring now to FIG. 2, there is described a circle 5 with radius Ro and with center at the origin O, and two straight lines 6 and 7 touch the circle 5. A region surrounded by the circle 5 and the straight lines 6 and 7 is designated by numeral 8. Further, numerals 9 and 10 designate straight lines intersecting the straight lines 6 and 7 respectively at right angles thereto and passing through the origin O. Let it be supposed that any point $P(r, \theta)$ as a part of the subject exists within the region 8. Thereupon, numeral 11 designates a straight line which passes through the point $P(r, \theta)$ at an angle $\phi'$ within an angular range H formed between the straight lines 9 and 10.

The distance between the straight line 11 and the origin is R, and it is clear from FIG. 2 that there is a relationship $R<r$. Accordingly, no projection data along the straight line 11 are, if measured, effective to form the reconstruction of the original distribution or subject. The distance R' of the line 11' from origin O is larger than, r. Then, considering a line 11' a projection data along the line 11 seems to be effective to reconstruct the image of the point P, but as the line 11' does not pass through the region 8, the projection data along the line 11' is value 0. That is why the projection data along the line 11' is not effective to reconstruct the original distribution. Accordingly, projection data along angular directions within the angular range H have no effect on the reconstruction of the point $P(r, \theta)$ in the region 8. If all points of the subjects are located within the region 8, on the other hand, the original distribution can be reconstructed without considering the projection data contained in the angular range H.

Figure 3:
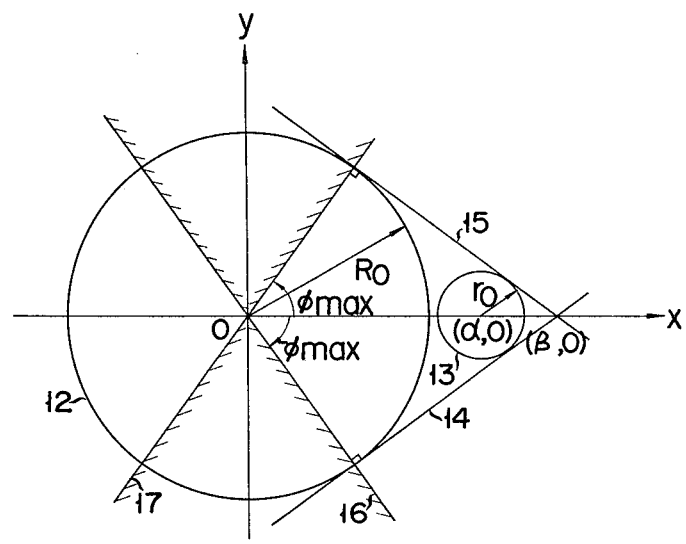

As shown in FIG. 3, for example, a region defined by a circle 13 with radius $r_0$ centering around a point $(\alpha, 0)$ on the X-axis outside a circle 12 with radius Ro is fixed as a range within which the subject (original distribution) can exist. Hereupon, the angular range of proejction data indispensable to the reconstruction of the original distribution within the circle 13 is defined by straight lines 16 and 17 passing through the origin O and perpendicularly intersecting straight lines 14 and 15 which circumscribe the two circles and intersect each other at a point $(\beta, 0)$ on the X-axis. If the angles between the straight lines 16 and 17 and the X-axis are $-\phi$max, and $+\phi$max, respectively, the original distribution inside the circle 13 can be reconstructed only by the projection data within an angular range of $-\phi$max to $+\phi$max. As is evident from FIG. 3, we have $$\cos \phi\text{max} = \frac{Ro}{\beta} = \frac{ro}{\beta - \alpha} = \frac{Ro - ro}{\alpha}, \quad (8)$$

and $\phi$ max generally becomes smaller as Ro is set greater.

Since the above relationships indicate the relative locations, the projection data can always be transferred into a specified region without changing the angular information in the data by parallelly moving the subject and, if necessary, by scale conversion as long as the subject distribution exists within a finite-range region.

Accordingly the image reconstruction apparatus of the invention is characterized by including a means for collecting projection data from a multitude of angular directions within a predetermined angular range less than 180° with respect to a subject, and a means for performing parallel displacement of these projection data so that the subject may substantially be located within a specific region corresponding to the aforesaid angular range spaced from the origin.

Figure 4A:
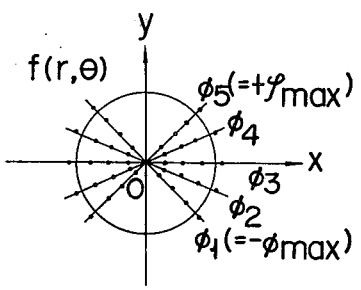
Figure 4B:
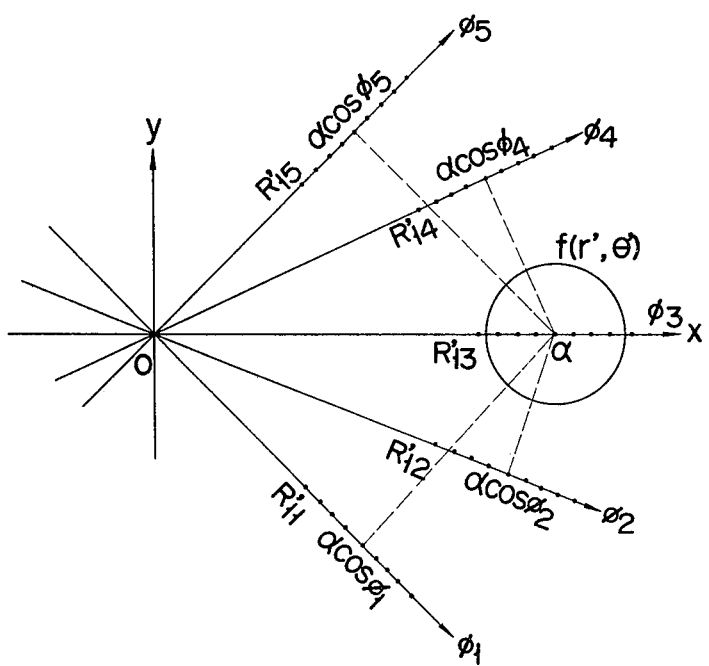

As shown in FIG. 4A, for example, projection data $g(R, \phi_1)$ to $g(R, \phi_5)$ are collected from directions at angles $\phi_1$ to $\phi_5$ to the original distribution $f(r, \theta)$. In FIG. 4A, projection data $g(R, \phi i)$ along the direction of an angle $\phi i$ (these are obtained through a set of beams at right angles to the direction of the angle $\phi i$) are represented by black spots distributed on a straight line extending along the $\phi i$ direction. Then, if the original distribution (given by $f(r', \theta')$) is located at a distance $\alpha$ from the origin, as shown in FIG. 4B, the projection data along the direction of the same angles $\phi_1$ to $\phi_5$ as shown in FIG. 4A are obtained at the positions of black spots shown in FIG. 4B. If these projection data are represented by $g(R', \phi i)$, then R', as is evident from FIG. 4B, is given by $$R' = R + \alpha \cos \phi i. \quad (9)$$

Therefore, by parallel displacement of the projection data $g(R, \phi i)$ in the direction of the angle $\phi i$ according to eq. (9), there may be obtained projection data $g(R', \phi i)$ for a case where the original distribution exists within the specific region. Here it is to be noted that the parallel displacement should be performed only when changing a parameter for the designation of the projection data position from R to R', and that the projection data themselves need never be modified.

Thereafter, it is necessary only that the Fourier coefficient $gn(R')$ of the projection data $g(R', \phi i)$ be calculated, and that the original distribution in the position at a distance $\alpha$ from the origin be reconstructed.

The calculation of the Fourier coefficient $gn(R')$ from the displaced projection data $g(R', \phi)$ may be performed in accordance with the following equation as a modification of eq. (4, that is, $$gn(R') = \frac{1}{2\pi} \int_{-\phi\text{max}}^{\phi\text{max}} g(R', \phi) e^{-in\phi} d\phi \quad (10)$$

In an embodiment stated below, a Fourier coefficient fn(r') corresponding to the original distribution f(r', θ') is calculated according to $$fn(r') = -\frac{1}{\pi} \frac{d}{dr} \int_{r'}^{r'max} \frac{gn(R') \; Tn(R'/r')}{\sqrt{(R'/r')^2 - 1} \cdot R'} dR' \quad (11)$$

and then the original distribution is obtained as follows:

$$f(r', \theta') = \sum_{n=-nmax}^{nmax} fn(r')e^{in\theta'}. \quad (12)$$

Here r'max depends on the moved distance α of the original distribution, and nmax is the maximum degree of the Fourier coefficient and Tschebyscheff polynomial that will practically exert no influence on the quality of image. In another embodiment as mentioned later, moreover, projection data g(R'φ) corresponding to angular ranges $(-\pi \sim -\phi max, +\phi max \sim +\pi)$ in which no projection data are actually collected are obtained from the calculated Fourier coefficient gn(R') in accordance with $$g(R',\phi) = \sum_{n=-nmax}^{nmax} gn(R')e^{in\phi}, \quad (13)$$

and these projection data g(R', φ) are moved parallel in the opposite direction to obtain the projection data $(-\pi \leq \phi < -\phi max, +\phi max < \phi \leq +\pi)$ corresponding to the original distribution f(r, θ) including the origin. The original distribution may be reconstructed by the well-known reconstruction methods of various kinds, such as the convolution method, filtered back projection method, Fourier transform method, etc., with use of the projection data corresponding to the original distribution f(r, θ) and the actually collected projection data g(R, φ) ($-\phi max \leq \phi \leq +\phi max$).

Figure 5:
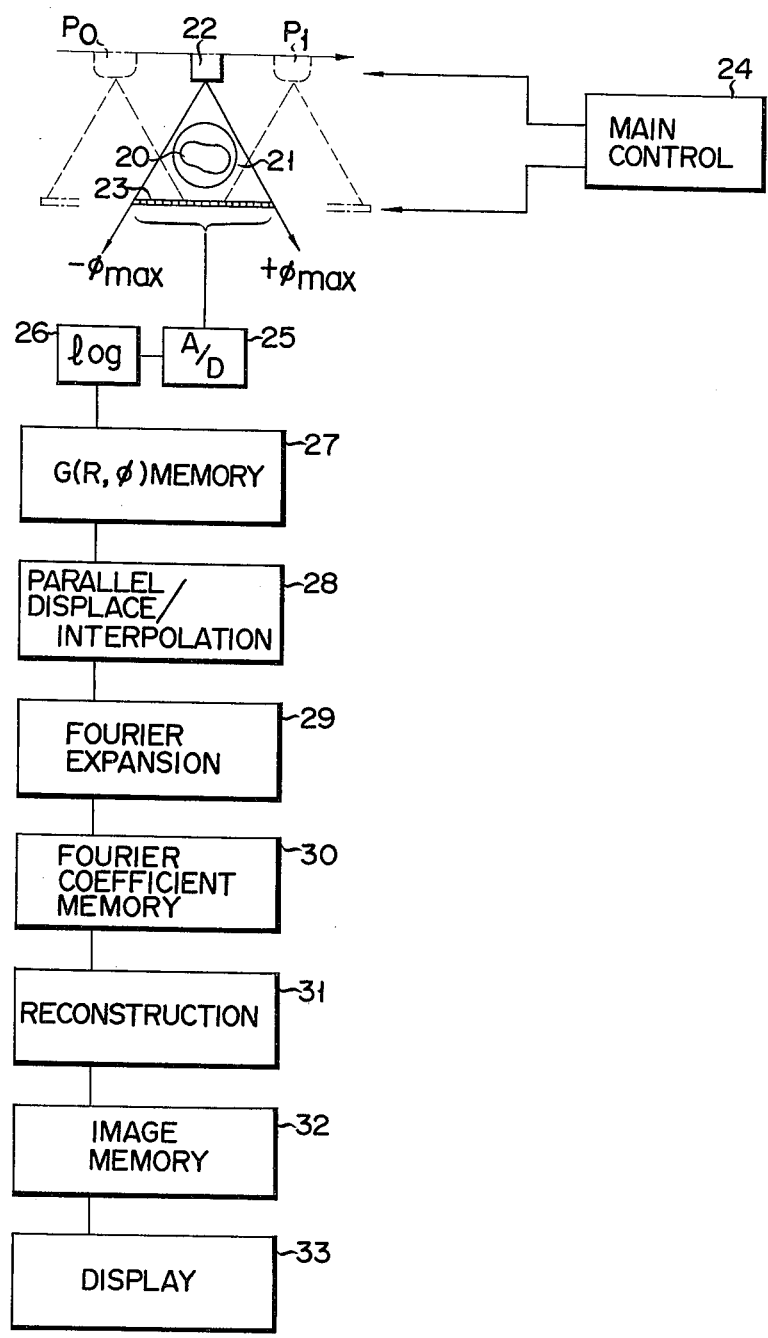
FIG. 5 is a block diagram showing an embodiment of the invention.

FIG. 5 shows an embodiment of this invention in which the invention is applied to a CT apparatus. In this embodiment, there is obtained a slice image which indicates the distribution of the X-ray absorption coefficients of a subject 20. Here the subject 20 is located within a specified region 21. Numeral 22 designates an X-ray source emitting a fan-shaped X-ray beam to cover the region 21, while numeral 23 designates a group of X-ray detectors which convert the intensities of X-ray beams transmitted through the subject 20 into electric signals. The X-ray source 22 and the X-ray detector group 23 face with the subject 21 therebetween, and are parallelly moved from point $P_0$ to $P_1$ shown at a fixed speed under the control of a main control unit 24, with their positional relationship maintained as they are.

The X-ray detector group 23 consists of N units of xenon gas detectors or semiconductor X-ray sensors arranged in a line or arc at regular intervals. The electric signals delivered from such X-ray detector group 23 are supplied to an A/D converter 25 at suitable sampling intervals, and are converted into digital signals thereat. These digital signals are logarithmically converted by a log converter 26, and then stored in a projection data memory unti 27. Each projection data obtained in this manner is substantially equivalent to each set of parallel beams applied from an angular direction within the range of beam spread angle ($-\phi max \sim +\phi max$) of the X-ray source 22. These projection data are represented by g(Rj, φi) (i=1, 2, ... N; j=1, 2, ... M). Here we have $\phi_1 = -\phi max$ and $\phi_N = +\phi max$, and $\phi_i - \phi_{i-1} = \Delta\phi$ is equivalent to an angle formed between two X-ray beams incident upon each two adjacent X-ray detectors.

Subsequently, the projection data in the memory unit 27 are supplied to a parallel displacement/interpolation unit 28. The unit 28 performs parallel displacement in accordance with eq. (9), and then interpolative operation. The interpolative operation is performed because no projection data can be obtained, on the basis of the digital operation, in proper positions due to the parallel displacement of the projection data when a Fourier expansion unit 29 for the next stage calculates Fourier coefficients.

The Fourier expansion unit 29 calculates Fourier coefficients gn(R'k) (k=1, 2, ... K) according to eq. (10), and stores them in a Fourier coefficient memory unit 30. A reconstruction unit 31 reconstructs the original distribution from the Fourier coefficients in the memory unit 30, and stores a resultant image in an image memory unit 32. The image in the memory unit 32 is supplied to and displayed on a display unit 33 as required for a diagnosis.

Figure 6:
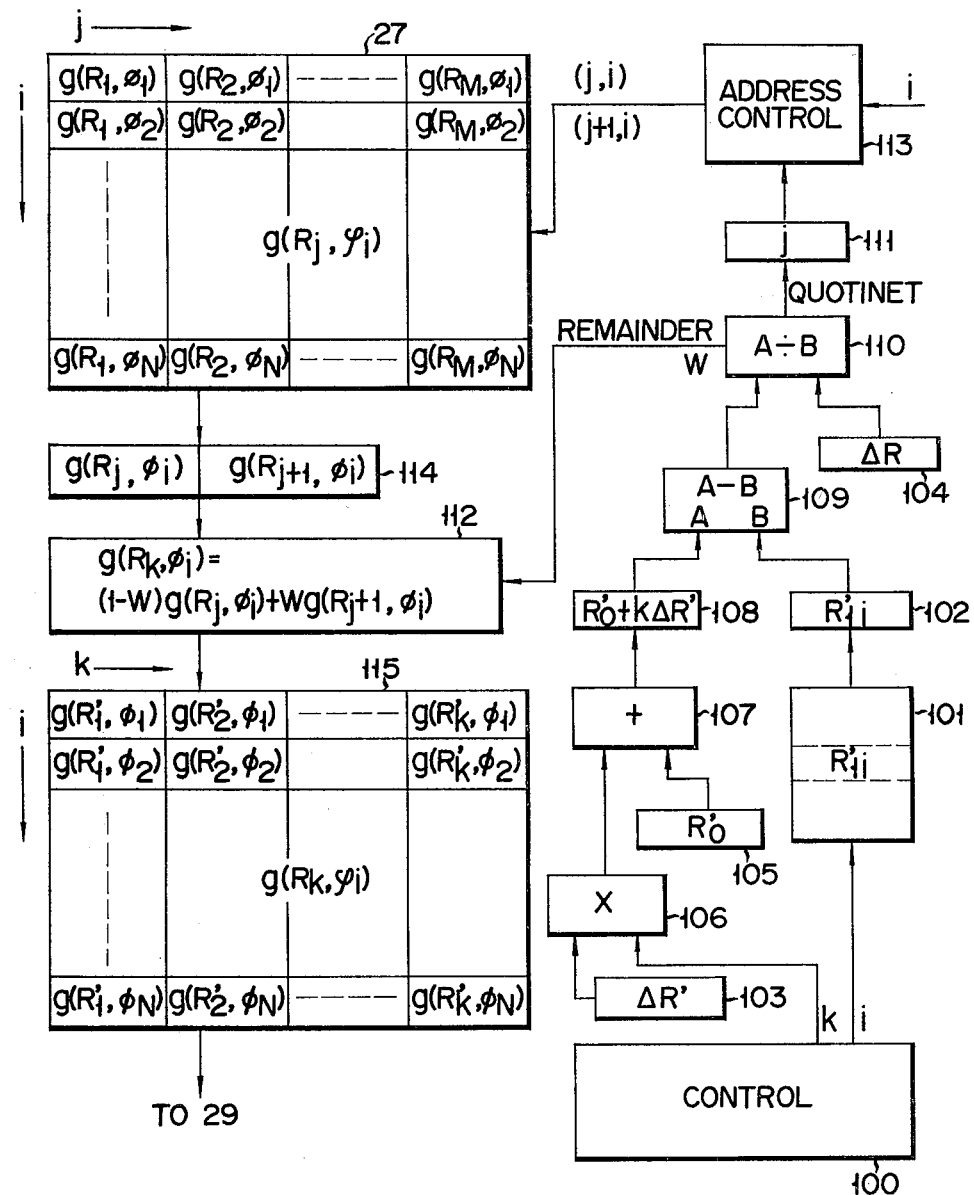
FIG. 6 is a block diagram showing in detail a parallel displacement unit and an interpolation unit shown in the block diagram of FIG. 5.

FIG. 6 shows a practical arrangement of the parallel displacement/interpolation unit 28. Here let us suppose that projection data g(Rj, φi) are stored in the projection data memory unit 27 as shown so that their positions may be designated by (j, i). A control circuit 100 includes two counters to produce the parameters k and i and controls the whole unit. A memory 101 stores initial values R'li (i=1, 2, ... N) after parallel displacement, and delivers to a register 102 a value R'li corresponding to a specified value i from the control unit 100. Here, as shown in FIG. 4B, the value R'li represents the position of a projection data farthest from the origin O, and is a value which is previously calculated as $$R_{li}' = \alpha \cos\phi i - \frac{N}{2} \Delta R. \quad (14)$$

Here ΔR is $\Delta R = R_i - R_{i-1}$ equivalent to the interval between each set of parallel beams. Also, initial values are previously set in registers 103 to 105. The register 103 is given the sampling interval $\Delta R' = R'_k - R'_{k-1}$ of the Fourier coefficients gn(R'k), while the registers 104 and 105 are supplied with the value ΔR and the initial value $R_0'$ of the parameter R'k of a Fourier coefficient gn(R'k) calculated by the Fourier expansion unit 29, respecivtely.

A multiplier 106 calculates the product of the value ΔR' in the register 103 and the value k from the control circuit 100, and supplies it to an adder 107. The adder 107 adds an output kΔR' from the multiplier 106 and the value R'0 in the register 105, and sets the resultant sum in a register 108. A subtracter 109 calculates the difference between the values in the registers 108 and 102, and supplies it to a divider 110. The divider 110 divides the difference obtained in the subtacter 109 by the value ΔR in the register 104, and sets the quotient in a register 111, and supplies the remainder to a primary interpolator 112.

The current number j in the register 111 is transmitted to an address control circuit 113. The address control circuit 113 accesses the memory 27 by means of the value j and the value i supplied from the control circuit 100, and takes out the projection data g(Rj, φi) and g(Rj+1, φi) of addresses (j, i) and (j+1, i) into a register 114. The primary interpolator 112 calculates an interpolation value g(R'k, φi) from the current number in the register 114 according to $$g(R'_k, \phi i) = (1-W) g(R_j, \phi i) + (W) g(R_{j+1}, \phi i) \quad (15)$$

with a value W supplied from the divider 110 as a weight coefficient. The calculated interpolation value is stored in an interpolation value memory 115 with the values i and k as addresses. Thereafter, the control circuit 100 performs the same operation until the value k reaches K, similar processes are repeated with respect to k=1, 2, ... K by inching the value i after a process of obtaining k=K is finished. When the value i reaches N to complete a process of obtaining i=N, all the necessary projection data for Fourier expansion are formed in the interpolation value memory 115. It is to be understood that higher-degree interpolation may be performed in place of the primary interpolation.

Figure 7:
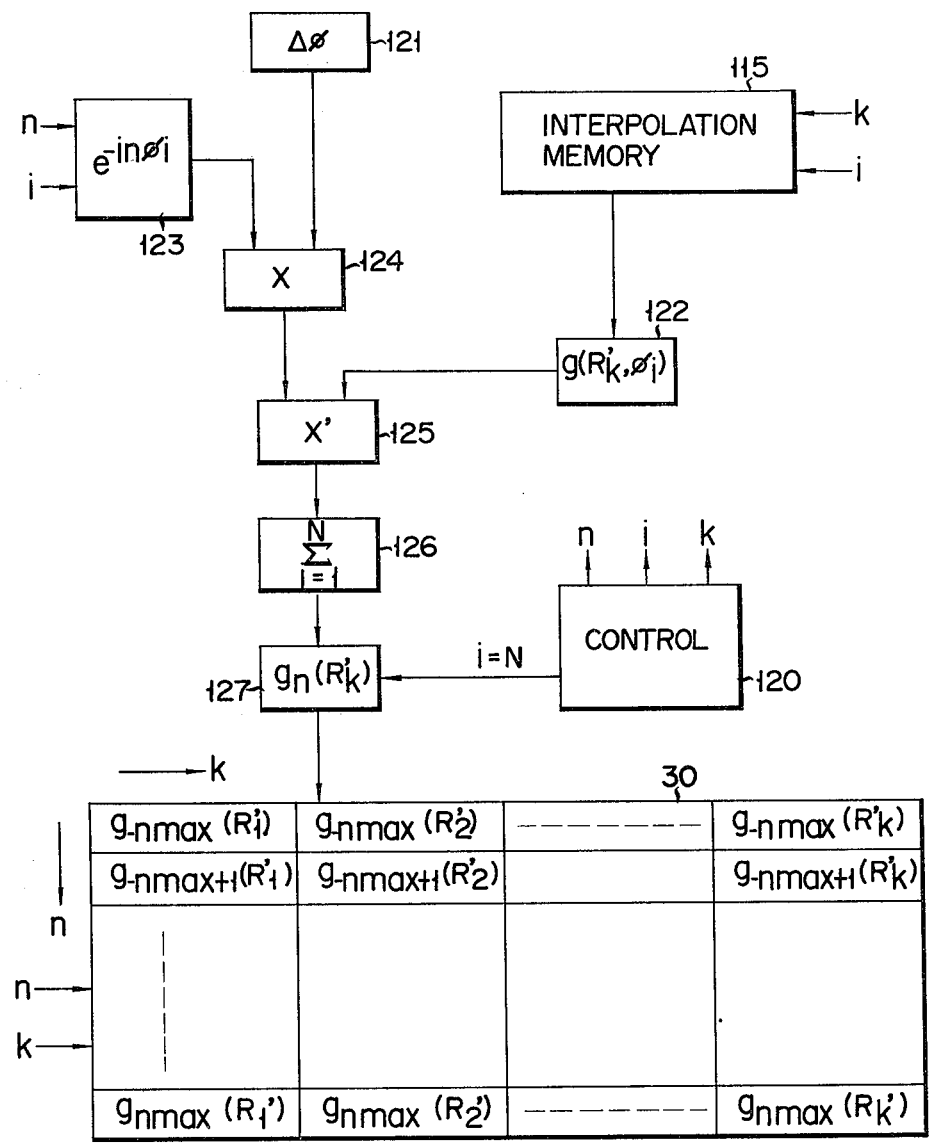
FIG. 7 shows in detail a Fourier expansion unit shown in the block diagram of FIG. 5.

FIG. 7 shows a practical arrangement of the Fourier expansion unit 29. A value Δφ is previously set in a register 121. A control circuit 120 includes three counters to produces parameters n, i and k and controls the whole unit. A data g(R'$_{k1}$, φi) corresponding to the values i and k is taken out of the interpolation value memory 115, and set in a register 122. When supplied with the values i and k, a function generator 123 delivers a value $e^{-in\phi i}$. A multiplier 124 calculates the product of the current number in the register 121 and the output of the function generator 123, and supplies it to a multiplier 125. The multiplier 125 calculates the product of the output of the multiplier 124 and the current number in the register 122. The output of the multiplier 125 is supplied to an accumulator 126 to be accumulated therein. Thereafter, the value i is inched in regular sequence with the values n and k kept constant, and the accumulated value in the accumulator 126 is set in a register 127 when i=N is obtained. The content of the register 127 is stored in the Fourier coefficient memory unit 30 designated by the values n and k. Thereafter, similar processing is performed while inching the value k, and, when k=K is reached, n is inched by 1 to execute operations for k=1, 2, ... K. When processes for n=−n$_{max}$, −n$_{max}$+1, ... −1, 0, +1, ... n$_{max}$ are finished, all the Fourier coefficients are formed in the Fourier coefficient memory unit 30.

The reconstruction unit 31 of FIG. 5, which may be made up, for example of a minicomputer so programmed as to execute the operations given by eqs. (11) and (12), will not expressly be described in detail herein.

Figure 8:
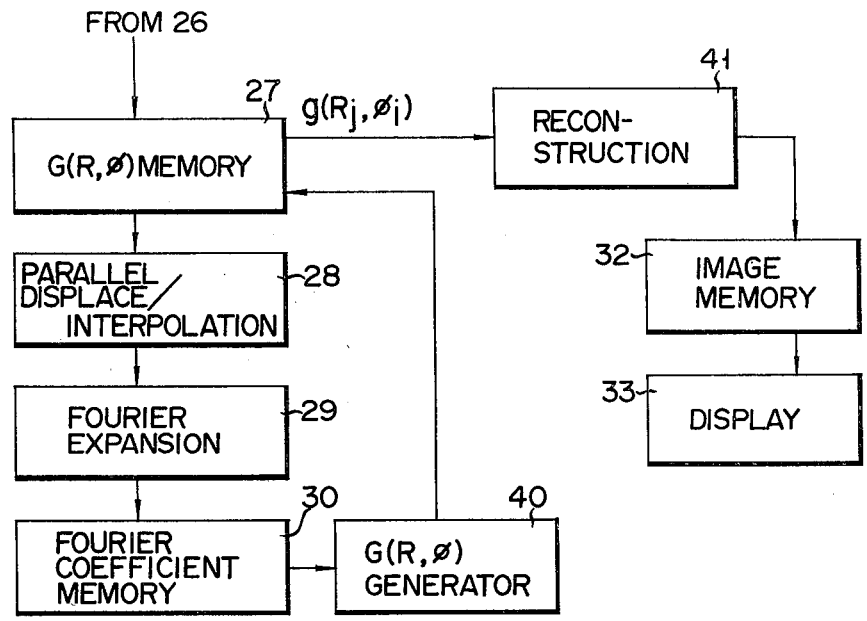
FIG. 8 is a block diagram showing another embodiment of the invention.

FIG. 8 shows another embodiment of this invention. In this embodiment, there is provided a projection data generator 40 for generating projection data g(Rj, φl) for an angular range (−π~−φmax, +φmax~+π) in which no data are actually collected from the Fourier coefficients gn(R$_k$'). The generated projection data are stored in the memory unit 27. In the projection data memory unit 27, therefore, exist projection data from all angular directions (−π~+π) of the subject. Thus, the original distribution can be reconstructed by means of a reconstruction unit 41 which employs a conventional reconstruction method, such as convolution method, filtered back projection method, or Fourier transform method.

Figure 9:
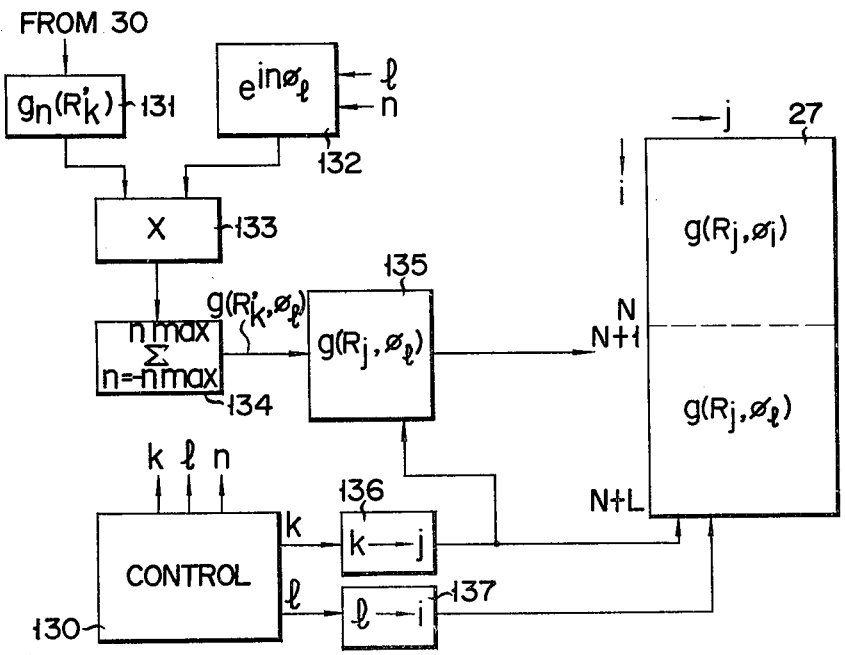
FIG. 9 is a block diagram showing in detail a projection data generator shown in FIG. 8.

FIG. 9 shows a practical arrangement of the projection data generator 40. A control circuit 130 includes three counters to produce parameters k, l and n, and controls the whole unit. The values n and k are supplied to the Fourier coefficient memory unit 30, and a Fourier coefficient gn(R$_k$') corresponding to these values is taken out and set in a register 131. When supplied with the values l and n, a function generator 132 produces a value $e_{in\phi l}$. Here angle φl (l=1, 2, ... L) falls within the no-data angular range (−π~−φmax, +φmax~+π). The current number in the register 131 and the output of the function generator 132 are accumulated in an accumulator 134 after their product is calculated by a multiplier 133. The accumulator 134 supplies a parallel displacement/interpolation unit 135 with a resultant value g(R'$_k$, φl) obtained by accumulating until n=−n$_{max}$, −n$_{max}$+1, −n$_{max}$+2, ... 1, 2, ... n$_{max}$ is reached with the value l maintained constant. In the unit 135, which may be constructed in substantially the same manner as the foregoing parallel displacement/interpolation unit 28, parallel displacement from R'$_k$ to Rj is achieved. Converters 136 and 137 convert the parameters k and l into j and i, respectively, and store projection data g(Rj, φl) obtained at the unit 135 in the projection data memory unit 27 in accordance with these values i and j.

In the embodiment of the invention, there are produced those projection data which are not collected actually, and the projection data in the no-date angular range, are not obtained by presumption, and the precision of image is greatly improved.

According to this invention, as described above, the original distribution can be reconstructed by using only those projection data which are collected severally along a multitude of angular directions within a narrow angular range less than 180°, so that scanning mechanisms for data collection can greatly be simplified in construction.

The apparatus of this invention is characterized in that the parameter R of projection data g(R, φ) from angular directions corresponding to −π<−φmax≦φ≦+φmax<+π is changed by parallel displacement into projection data g(R', φ) represented by a parameter R' so that a Fourier coefficient gn(R') corresponding to the parameter R' may be obtained, thereby ensuring reconstruction of the original distribution using the Fourier coefficient gn(R') to be executed next.

In an actual apparatus, the unit for the parallel displacement would rather be incorporated in another signal processing unit than be provided independently. In the above-mentioned embodiments, the parallel displacement unit is incorporated in an interpolation unit. In any case, projection data g(R', φ) obtained by parallel displacement are equivalent to projection data that are obtained when a subject is located substantially within a specific region corresponding to a collecting angular range and spaced from the origin. If the subject exists inside the specific region, none of projection data corresponding to the no-data angular range, except 0, will contribute to the formation of a Fourier coefficient gn(R') for a parameter R'. Part or whole of the aforesaid processing can be executed by using a digital computer. Since the Fourier coefficient gn(R') is represented by a complex number, real and imaginary parts thereof can be calculated separately.

Although in the above-mentioned embodiments this invention is applied to the reconstruction of X-ray slice images in a CT apparatus using X-ray beams, it is to be understood that the invention may also be applied to a CT apparatus using γ-ray beams or ultrasonic beams.

Recently, moreover, there have been observed apparatus for reconstructing distributed images of water in living bodies by means of NMR (nuclear magnetic resonance). The principle of image reconstruction of such NMR apparatus is essentially the same as that of the aforementioned CT apparatus. That is, projection data for the distribution of desired nuclei, such as those of hydrogen atoms, along the straight line 3 of FIG. 1 may basically be obtained by applying magnetic-flux beams to be subject along the straight line 3. Like in the case of the CT apparatus, therefore, the magnetic-flux beams are applied from a multitude of directions, though the irradiation directions can be electromagnetically deflected within a certain angular range due to the nature of magnetic field. Then, by applying the invention to the NMR apparatus, there may be provided a practical apparatus which requires no mechanical scanning system for collecting projection data.

Besides the medical fields, moreover, the invention can also be applied to radar systems, inspection apparatus for the interior of various substances, and a wide variety of other fields.

What is claimed is:

1. In an image reconstruction system, the method for reconstructing a slice image of a subject within an area under examination comprising the steps of:
   (a) projecting rays at a scan angle through a slice of the subject and detecting the rays penetrating through the slice to generate data signals representing the intensities of said detected rays;
   (b) repeating step (a) for a plurality of different scan angles $\phi$ located in a sector scan of less than 180° centered about a point in said area to obtain projection data G(R, $\phi$) representative of the intensity and direction of the detected data signals over the sector scan of less than 180°;
   (c) performing a parallel displacement of the projectin data G(R, $\phi$) in the direction of the original angles $\phi$ according to the equation $R'=R+\alpha \cos\phi$ to transfer the projection data G(R, $\phi$) into displaced projection data G(R', $\phi$) that represents data projected by a constant $\alpha$ to an area within a specified region spaced from the origin of the subject so that R' is greater than r, the radius of the area being scanned;
   (d) calculating the Fourier coefficient $g_n(R')$ according to the equation $$gn(R') = \frac{1}{2\pi} \int_{-\phi max}^{\phi max} g(R', \phi)e^{-in\phi}d\phi;$$

(e) calculating the Fourier coefficient $f_n(r')$ according to the equation $$fn(r') = \frac{-1}{\pi} \frac{d}{dr'} \int_{r'}^{r' max} \frac{gn(R') Tn(R'/r')}{\sqrt{(R'/r')^2 - 1} \cdot R'} dR';$$

(f) reconstructing a slice image representative of the entire subject according to the equation $$f(r', \theta') = \sum_{n=-nmax}^{nmax} fn(r')e^{in\theta'}$$

where n is an integer denoting the order of the Fourier series expansion; and
   (g) displaying the reconstructed slice image.

2. In an image reconstruction system, the method for reconstructing a slice image of a subject within an area under examination comprising the steps of:
   (a) projecting rays at a scan angle through a slice of the subject and detecting the rays penetrating through the slice to generate data signals representing the intensities of said detected rays;
   (b) repeating step (a) for a plurality of different scan angles $\phi$ located in a sector scan of less than 180° centered about a point in said area to obtain projection data G(R, $\phi$) representative of the intensity and direction of the detected data signals over the sector scan of less than 180°;
   (c) performing a parallel displacement of the projection data G(R, $\phi$) in the direction of the original angles $\phi$ according to the equation $R'=R+\alpha \cos\phi$ to transfer the projection data G(R, $\phi$) into displaced projection data G(R', $\phi$) that represents data projected by a constant $\alpha$ to an area within a specified region spaced from the origin of the subject so that R' is greater than r, the radius of the area being scanned;
   (d) calculating the Fourier coefficient $g_n(R')$ according to the equation $$gn(R') = \frac{1}{2\pi} \int_{-\phi max}^{\phi max} g(R', \phi)e^{-in\phi}d\phi;$$

(e) generating projection data g(R', $\phi$) corresponding to the angular ranges between $-\pi$ and min $-\phi$ and $+\pi$ and max $+\phi$ in which no projection data are actually calculated according to the equation $$g(R', \phi) = \sum_{n=-nmax}^{nmax} gn(R')e^{in\phi}$$

where n is an integer denoting the order of the Fourier series expansion;
   (f) performing a parallel displacement of the projection data g(R', $\phi$) in the direction opposite to the parallel displacement performed in step (c);
   (g) reconstructing a slice image representative of the entire subject with the use of the projection data G(R, $\phi$) obtained in step (b) and the displaced projection data g(R', $\phi$) obtained in step (f), and
   (h) displaying the reconstructed slice image.

3. The method of claim 2 wherein the reconstruction method is selected from the group consisting of the convolution method, the filtered back projection method, and the Fourier transform method.

4. An image reconstruction apparatus comprising:
   transmission means for emitting through a slice of a subject under examination of plurality of rays to provide a fan-shaped beam over a range of $\theta$ max and $-\theta$ max which is less than 180° centered about a point in said subject;
   detection means positioned opposite the transmission means for detecting the intensity and direction of the rays transmitted through the subject to obtain projection data G(R, $\phi$) representative of the intensity and direction of the detected data signals;
   displacement means, inteconnected with said detection means, for performing a parallel displacement of the projection data G(R, $\phi$) in the direction of the original angles $\phi$ according to the equation $R'=R+\alpha \cos\phi$ to transfer the projection data G(R, φ) into displaced projection data G(R', φ) that represents data projected by a constant α to an area within a specified region spaced from the origin of the subject so that R' is greater than r, the radius of the slice being scanned;

expansion unit means, interconnected with said displacement means, for calculating the Fourier coefficients gn(R') according to equation $$gn(R') = \frac{1}{2\pi} \int_{-\phi max}^{\phi max} g(R', \phi) e^{-in\phi} d\phi;$$

first reconstruction unit means, interconnected with said expansion unit means, for calculating the Fourier coffficient $f_n(r')$ according to the equation $$fn(r') = \frac{-1}{\pi} \frac{d}{dr'} \int_{r'}^{r'max} \frac{gn(R') Tn(R'/r')}{\sqrt{(R'/r')^2 - 1} \cdot R'} dR';$$

second reconstruction unit means, interconnected with said first reconstruction unit means, for reconstructing a slice image representative of the entire subject according to the equation $$f(r', \theta') = \sum_{n=-nmax}^{nmax} fn(r') e^{in\theta'}$$

where n is an integer denoting the order of the Fourier series expansion; and display unit means, interconnected with said second reconstruction unit means, for displaying the reconstructed slice image representative of the entire subject.

5. The apparatus of claim 4 including means for moving the transmission means and the detection means in parallel at a fixed speed.

6. The apparatus of claim 5 wherein the detection means include a plurality of detectors arranged at regular intervals side-by-side.

7. The apparatus of claim 4 including means connected to the detection means for sampling the beams detected by said detection means, converting the sampled signals into digital signals, and storing a plurality of sampled and converted signals representing the projection data over the beam spread angle $-\theta$ max to $+\theta$ max.

8. An image reconstruction apparatus comprising:

transmission means for emitting through a slice of a subject under examination a plurality of rays to provide a fan-shaped beam over a range of θ max and $-\theta$ max which is less than 180° centered about a point in said subject;

detection means positioned opposite the transmission means for detecting the intensity and direction of the rays transmitted through the subject to obtain projection data G(R, φ) representative of the intensity and direction of the detected data signals;

first displacement means, interconnected with said detection means, for peforming a parallel displacement of the projection data G(R, φ) in the direction of the original angles φ according to the equation $R'=R+\alpha \cos \phi$ to transfer the projection data G(R, φ) into displaced projection data G(R', φ) that represents data projected by a constant α to an area within a specified region spaced from the origin of the subject so that R' is greater than r, the radius of the slice being scanned;

expansion unit means, interconnected with said displacement means, for calculating the Fourier coefficients gn(R') according to equation $$gn(R') = \frac{1}{2\pi} \int_{-\phi max}^{\phi max} g(R', \phi) e^{-in\phi} d\phi;$$

first reconstruction unit means, interconnected with said expansion unit means, for generating projection data g(R', φ) corresponding to the angular ranges between $-\pi$ and min $-\phi$ and $+\pi$ and max $+\phi$ in which no projection data are actually calculated according to the equation $$g(R',\phi) = \sum_{n=-nmax}^{nmax} gn(R') e^{in\phi}$$

where n is an integer denoting the order of Fourier series expansion;

second displacement means, interconnected with said first reconstruction unit means, for performing a parallel displacement of the projection data g(R', φ) in the direction opposite to the parallel displacement performed by the first displacement means;

second reconstruction unit means, interconnected with said detection means and said second displacement means, for reconstructing a slice image representative of the entire subject; and display unit means, interconnected with said second reconstruction unit means, for displaying the reconstructed slice image representative of the entire subject.

* * * * *